United States Patent
Cuprjak et al.

(10) Patent No.: US 8,773,458 B2
(45) Date of Patent: Jul. 8, 2014

(54) METHOD OF AND COMPUTER IMPLEMENTED SYSTEM FOR GENERATING A JUNCTION VIEW IMAGE

(75) Inventors: Marcin Cuprjak, Lodz (PL); Michal Rosikiewicz, Kalisz (PL); Marcin Bialas, Lodz (PL); Radoslaw Chmielewski, Lodz (PL)

(73) Assignee: TomTom Global Content B.V., Amsterdam (NL)

( * ) Notice: Subject to any disclaimer, the term of this patent is extended or adjusted under 35 U.S.C. 154(b) by 453 days.

(21) Appl. No.: 12/736,781

(22) PCT Filed: Jul. 30, 2008

(86) PCT No.: PCT/NL2008/050523
§ 371 (c)(1),
(2), (4) Date: Nov. 23, 2010

(87) PCT Pub. No.: WO2010/013997
PCT Pub. Date: Feb. 4, 2010

(65) Prior Publication Data
US 2011/0069087 A1    Mar. 24, 2011

(51) Int. Cl.
    *G09G 5/00*    (2006.01)
(52) U.S. Cl.
    USPC .......................... 345/619; 345/625; 345/629
(58) Field of Classification Search
    CPC combination set(s) only.
    See application file for complete search history.

(56) References Cited

U.S. PATENT DOCUMENTS

| | | | |
|---|---|---|---|
| 6,347,280 B1 | 2/2002 | Inoue et al. | |
| 6,397,145 B1 * | 5/2002 | Millington | 701/432 |
| 6,611,753 B1 | 8/2003 | Millington | |
| 6,622,085 B1 | 9/2003 | Amita et al. | |
| 7,957,893 B2 * | 6/2011 | Smartt | 701/450 |
| 2003/0130788 A1 | 7/2003 | Akashi | |
| 2004/0093153 A1 | 5/2004 | Buth et al. | |

FOREIGN PATENT DOCUMENTS

| | | |
|---|---|---|
| CN | 1168046 C | 9/2004 |
| CN | 1280612 C | 10/2006 |
| EP | 1 681 537 | 7/2006 |
| EP | 1 681 538 | 7/2006 |
| JP | 03-150699 | 6/1991 |
| JP | 10122893 A | 5/1998 |
| JP | 2003337033 A | 11/2003 |
| JP | 2008032635 A | 2/2008 |
| RU | 2233011 C2 | 7/2004 |
| WO | WO 99/57516 | 11/1999 |
| WO | WO 02/48651 | 6/2002 |
| WO | 2007037126 A1 | 4/2007 |

OTHER PUBLICATIONS

International Search Report, Aug. 5, 2009.

* cited by examiner

*Primary Examiner* — Kee M Tung
*Assistant Examiner* — Leon T Cain, II (57) ABSTRACT

A method of generating a junction view is disclosed. The method includes, in at least one embodiment:—acquiring a first junction from a map database;—acquiring a second junction from the map database, wherein the first and second junction are connected by way of an intermediate road segment;—determining a characteristic of the intermediate road segment between the first and second junction from the map database; and—if the characteristic of the road segment applies to a predefined condition:—adjusting the road geometry resulting in a shorter intermediate road segment; and—generating the junction view image visualizing the first and second junction using the shorter intermediate road segment. At least one embodiment of the method provides a solution to visualize in one image two decision points which will follow each other in a short time when traveling through the two decision points, i.e. two junctions.

17 Claims, 8 Drawing Sheets

METHOD OF AND COMPUTER IMPLEMENTED SYSTEM FOR GENERATING A JUNCTION VIEW IMAGE

FIELD OF THE INVENTION

The present invention relates to the field of generating junction view images for use in navigation applications. The invention further relates to a computer implemented system and a computer program product for generating a junction view image, and a processor readable medium provided with the computer program product.

BACKGROUND OF THE INVENTION

The use of navigation systems in vehicles is becoming increasingly prevalent. Usually an on board navigation computer system analyses the data from a GPS (Global Positioning System) sensor and possibly additional motion sensors and combines this with data from a digital map database and thereby determines the actual position and velocity of a vehicle.

Some navigation systems have provided algorithms for transforming data in the map database, associated with objects near a road intersection, into a 3-dimensional perspective view, i.e. junction view image, which is more easily understood by many users. Junction views are simplified, 3D representations of road situations helping drivers in maneuver situations. A junction view could be enhanced with an arrow indicating the maneuver a driver has to make in passing through a junction towards a desired destination. The junction view represents the junction and connected roads viewed from a point at some elevation above the road and before the junction. EP 1681537A1 and EP 1681538A1 discloses a navigation system with animated junction views. A junction view could further be linked to a specific location, i.e. junction, in the map database.

U.S. Pat. No. 6,611,753 discloses a navigation system with improved perspective view display. The navigation system displays a perspective view of an intersection at an angle relative to "earth". Based upon the complexity of the intersection displayed, the angle is increased to provide a more "overhead" view. The increased angle of the perspective view improves the understanding of the roads in the intersection.

SUMMARY OF THE INVENTION

The present invention seeks to provide a method of generating a junction view image for complex junctions. A complex junction according to the present invention is the situation where two junctions are separated by a relatively short distance with respect to each other. It is an object of the invention to provide a junction view creation process which provides satisfying visual results in perspective images. The objective problem is solved by the subject-matter of the independent claims. Dependent claims are directed to embodiments of advantage.

According to the invention, the method comprises:
acquiring a first junction from a map database;
acquiring a second junction from the map database, wherein the first and second junction are connected by means of an intermediate road segment;
determining a characteristic of the intermediate road segment between the first and second junction from the map database; and
if the characteristic of the road segment applies to a predefined condition:
adjusting the road geometry resulting in a shorter intermediate road segment; and
generating the junction view image visualizing the first and second junction using the shorter intermediate road segment.

In some modes of a navigation system, the system displays a perspective view of a junction and the next maneuver instruction to be performed by the driver along the recommended route. The invention is based on the recognition that the recommended route passes through two junctions which will be traversed within a short period of time but could not clearly be visualized in one single junction view image. Examples of such situation regularly occur on highway exits and interconnections. The highway exit is typically the first junction and within 300 meters a second junction will often occur with corresponding maneuver instruction to be performed by the driver. With a driving speed of 120 km/h, it will take about 10 seconds to travel from the first junction to the second junction. This means that the user has a maximum of only 9 seconds to look at the display for the next maneuver instruction. This is short especially when you take in to account that the driver is unfamiliar with the intersection and for safety reasons must look at the road most of the time. Therefore, according to the invention, if such a situation occurs, a junction view image will be presented which visualizes both junctions. According to the invention the road segment connecting the two junction is adjusted, i.e. shortened, in such a way that both junctions can be visualized in one image which is easy to understand by most users and to provide better decision point visibility.

In an embodiment of the invention, the method further comprises:
acquiring the road geometry of the road segments forming the first and second junction; and wherein
adjusting the road geometry performs an operation corresponding to moving the second junction and associated outgoing segments towards the first junction to obtain an adjusted road geometry, wherein the generating action is adapted to generate a perspective view image corresponding to the adjusted road geometry.

In a further embodiment of the invention, adjusting the road geometry means mapping the road geometry on a first, a second and a third zone each having a corresponding first, second and third zone length respectively, wherein the first junction is mapped at a first borderline between the first and second zones and the second junction is mapped at a second borderline between the second and third zones.

These zones provides a simple framework for positioning and adjusting the road geometry such that a perspective view image visualizes both junctions in a easy to understand manner.

In an embodiment of the invention, adjusting the road geometry further comprises a filtering action to smooth the road geometry which is performed after mapping the road geometry into the respective zones. These features reduce the effect of visual irregularities in the perspective view image.

In an embodiment of the invention, the method further comprises
generating a maneuver instruction through the first and second junctions; and wherein generating the junction view image is further arranged to superimpose a view of the maneuver instruction on the visualization of the first and second junction. These features enhances the perspective view image further.

In an embodiment of the invention, the characteristic of the intermediate road segment is the length of the road segment between the first and second junction and the condition is that the length is in a predefined range. Preferably, the predefined range is 20-300 meters.

In yet another embodiment of the invention, the characteristic is the traveling time needed to travel from the first junction to the second junction with a defined traveling speed associated with the road segment between the first and second junction, and the condition is that the traveling time is shorter then a predefined value. Preferably, the predefined value is 10 seconds.

It is an object of the invention to provide a method which enables a computer implemented system to generate a junction view image for visualizing two subsequent junctions in an easy to understand way and to link the image with the corresponding junctions in a database or to display the image.

SHORT DESCRIPTION OF DRAWINGS

The present invention will be discussed in more detail below, using a number of exemplary embodiments, with reference to the attached drawings, in which

FIG. 3 a-c shows a first example of an unmodified orthorectified road surface image and corresponding junction view images;

FIG. 4 a-c shows a first example of a modified orthorectified road surface image and corresponding junction view images according to the invention;

FIG. 7 a-c shows a second example of an unmodified orthorectified road surface image and corresponding junction view images; and, FIG. 8 a-c shows a second example of a modified orthorectified road surface image and corresponding junction view images according to the invention;

Wherever possible, the same reference numbers will be used throughout the drawing to refer to the same or like parts.

DETAILED DESCRIPTION OF EXEMPLARY EMBODIMENTS

Figure 1:
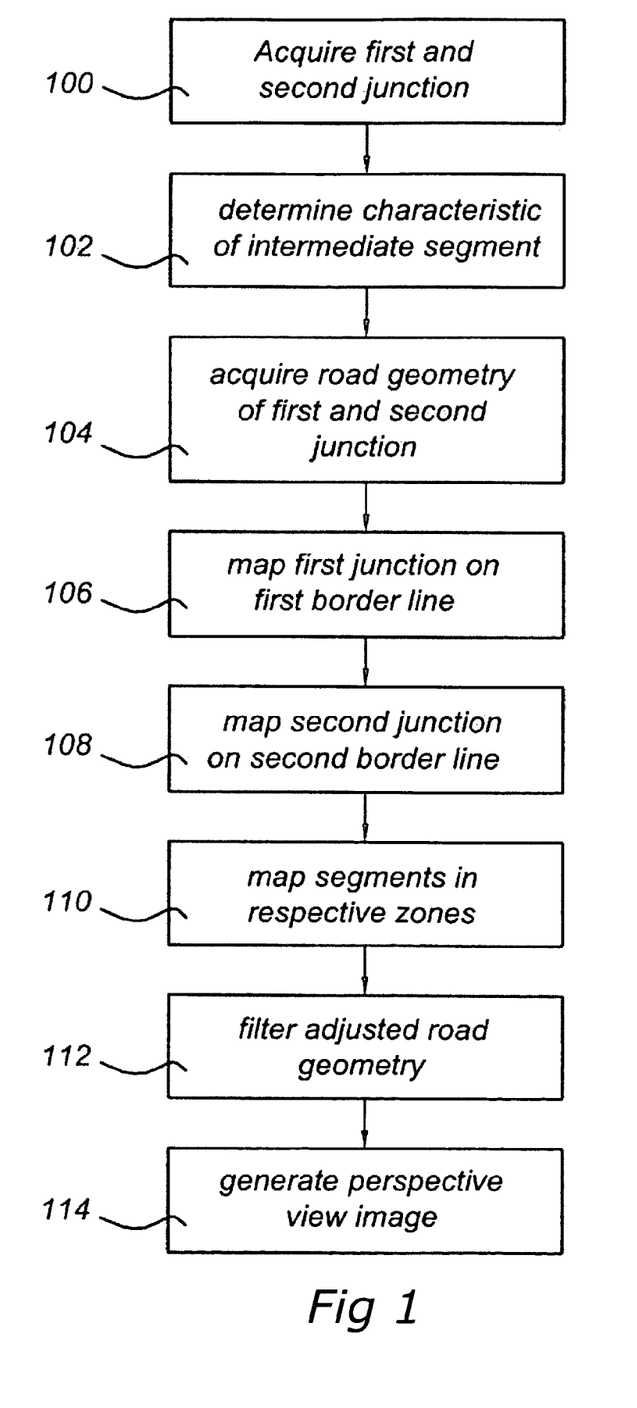
FIG. 1 shows a flow diagram of a junction view generation process according to the invention.

FIG. 1 shows a general overview of the flow for generating a junction view image according to the invention. A junction view image according to the present invention represents an adjusted road geometry of a first and second junction connected roads viewed from a point at some elevation above the road and before the first junction. The method starts with action 100 by acquiring a first and second junction from a digital map database. The method can be used to generate junction views for use in or in combination with a digital database. The generated junction views are generated to enhance the content of said database to offer users better insight in complex junction situations. A navigation device using such a database could use the junction view image to visually inform a user that he is approaching a complex junction situation by visualizing a pseudo-realistic view of said complex junction situation. A complex junction situation according to the present invention is the situation wherein a user will have to make two decisions in a relative short time interval, i.e. while traveling along the planned route the user will pass through two junctions in said time interval. If the traveling time between the two junction is short, for example less than 10 seconds, a user will not have sufficient time to look at both the road and the display of the navigation device. If he is looking too long on the road, he will miss the presented junction view of the second decision point and possibly take the wrong path. If he is looking too long at the display, he will not have sufficient time to safely prepare for the maneuver at the next junction. It might be clear that if the navigation device has sufficient processing power, the navigation device could comprise the software to perform the method according to the invention and generate the complex junction view images on the fly and determine for each junction that the navigation device is approaching whether it will be visualized as a complex junction or a single junction. Alternatively, the junction views can be pre-computed and stored in the map database or other appropriate file.

Therefore, in action 102, a characteristic of the road segment(s) between the first and second junction is determined. In an embodiment, the characteristic is the length of the road segment. The length is determined from data in the digital map database. If the digital map database comprises information about the maximum or average traveling speed across said road segment, the characteristic could be the minimum or the average time to travel from the first junction to the second junction. If the characteristic satisfies a predefined condition, the subsequent action will be performed. In an embodiment, the predefined condition is that the length of the road segment is in a predefine range. In an embodiment, the range is 20-300 meters. In another embodiment the predefined condition is that the time to traverse the road segment is in a predefined range. In an embodiment, the range is 1-10 seconds.

If the characteristic satisfies the predefined condition, the road geometry is acquired from the digital map database (action 104, in FIG. 1). The road geometry includes all incoming and outgoing road segments from the first and second junction. It should be noted that action 104 could be performed in action 100 acquire first and second junction.

Figure 2A:
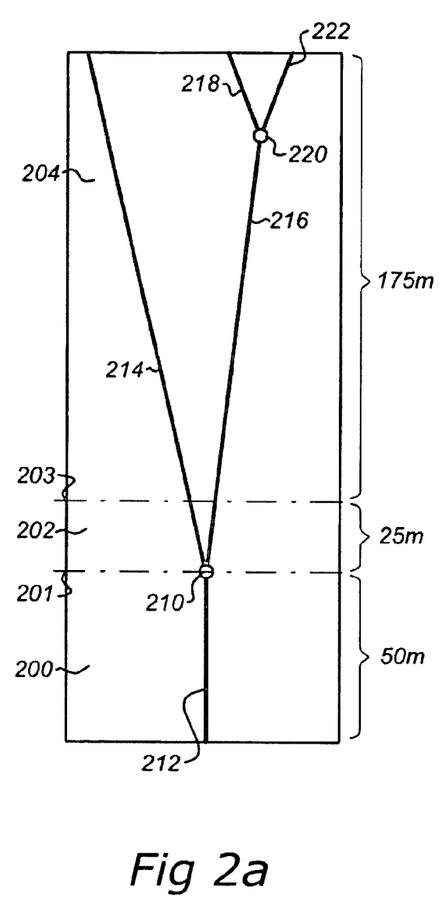
FIG. 2 illustrates an example of the road geometry adjustment according to the invention.
Figure 2B:
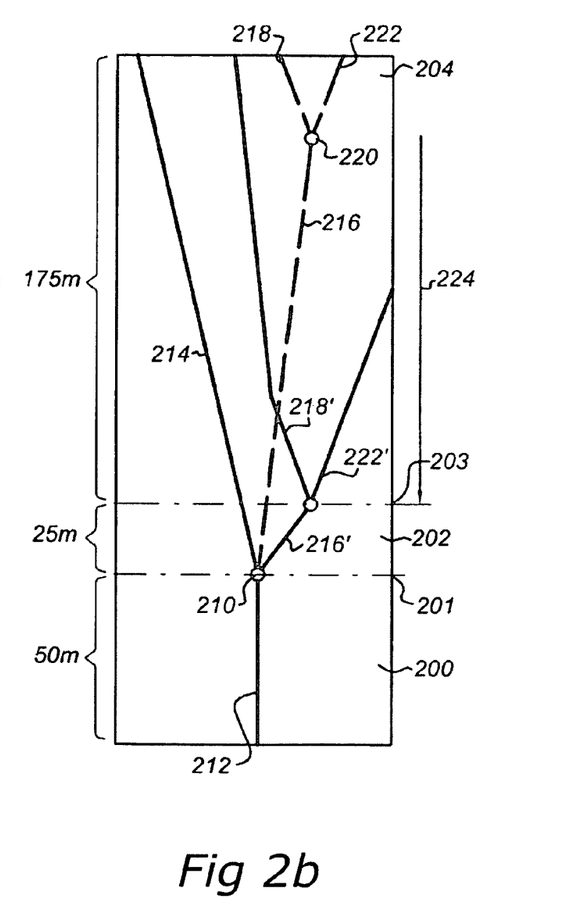
Figure 3A:
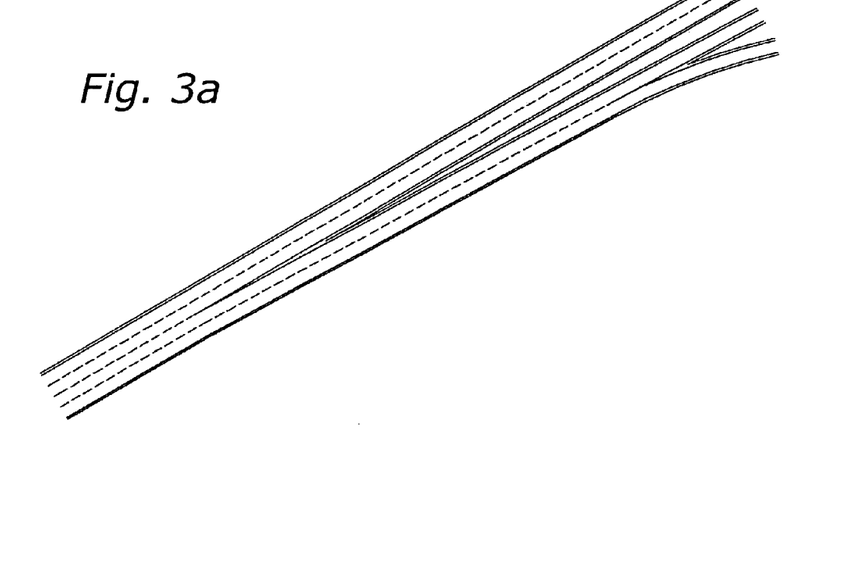

The left graph of FIG. 2 shows a simple view of a road geometry and FIG. 3a shows an orthorectified view of road segments, showing the respective lanes. FIG. 2 will be used to illustrate the subsequent actions 106-112 to perform the method according to the invention.

FIG. 2 shows at the left side a road geometry graph comprising a first junction 210 and a second junction 220. There is an incoming road segment 212. This segment is assumed to be the road on which a user is currently driving. The first junction 210 is the location ahead of the user wherein the incoming road segment 212 bifurcates into two other road segments 214, 216. The road segment 214 to the left, is an outgoing road segment and the road segment 216 to the right is an intermediate road segment connecting the first junction 210 with the second junction 220. At the second junction 220, the intermediate road segment 216 bifurcates into two outgoing segments 218, 222. All the information about the road geometry shown in the geometry graph has been obtained from the digital map database.

Generally, a junction view image visualizes the road ahead of the viewer and corresponds to an image taken by means of a camera at a specific height above the road or earth surface and a specific viewing angle with respect the earth or road surface. In a navigation application, each manufacturer has its own requirements with respect to the height and viewing angle. Furthermore, they could specify where a specified location in front of the camera, i.e. the first junction, is projected in the junction view image, i.e. on which image line. These requirements define which part of the road geometry, i.e. earth surface, can be visualized in the junction view image. In a junction view image, the width of an object and level of detail of said object decreases with increase of the distance between the viewing point and said object. In the current description it is assumed that the earth surface 250 meters ahead can be visualized in the junction view image.

FIG. 2 shows the road geometry graph of an area of 250 meters ahead and a particular width, which could correspond to the width of the artificial horizon in a junction view image. The area of 250 meters ahead is divided in three zones, a first zone 200 of 50 meters, a second zone 202 of 25 meters and a third zone 204 of 175 meters. For this area a perspective image will be generated. The top line 205 of the third zone 204 acts as a horizon line in the perspective view image. Road segments that extend above the top line will not be displayed. The top line 205 acts as a scene clipper. Between the first zone 200 and second zone 202 is a first borderline 201 and between the second zone 202 and third zone 204 is a second borderline 203.

In action 106, the first junction 210 is mapped on the first borderline 201, furthermore the road geometry graph is rotated such that the incoming segment 212 is mapped in the first zone 200. In the example presented in FIG. 2, the mapping is such that the incoming segment is perpendicular to the first borderline 201 and centered. This will result in a junction view image wherein the horizontal viewing direction is parallel to direction of the incoming section 212, thus that the road segment is viewed along the direction of the road segment. It should be noted that a vertical line in the area of 250 meters will be represented in the perspective view image as a line on the earth surface having a direction which is parallel to the horizontal viewing direction.

Figure 3B:
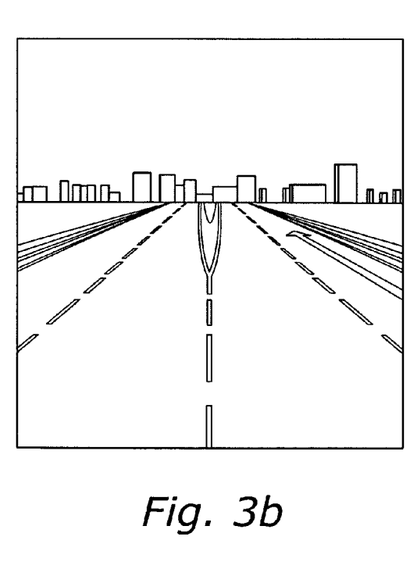
Figure 3C:
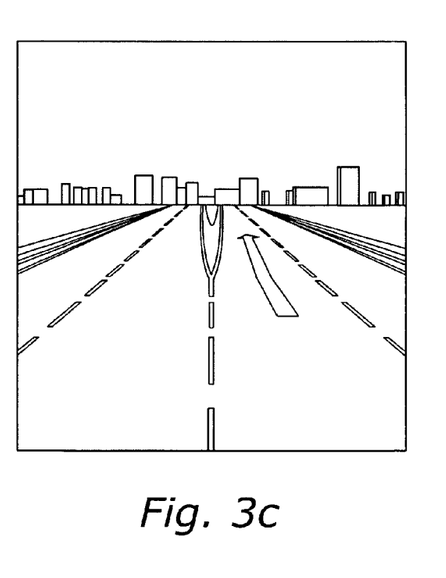

FIG. 3a shows an example of a part of a road network having a road geometry which is comparable to the road geometry shown in the left graph of FIG. 2. Shown is an orthorectified view of the road surface of a highway with four lanes. After 50 meters the four lanes are bifurcated in two times two lanes and the two right lanes bifurcate in two separate lanes 200 meters after the first bifurcation. FIGS. 3b and 3c show junction view images for use in a navigation device. The image includes a horizon line below which is displayed a perspective view of the road geometry shown in FIG. 3a. Above the horizon line is a representation of the skyline. FIGS. 3b and 3c include an arrow superimposed on the road surface indicating the maneuver instruction wherein the driver should take the first lane from the right FIG. 3b and the second lane from the right, FIG. 3c. Although, the two bifurcations, i.e. decision points, are relatively close to each other, this is very hard to see in the junction view images of FIGS. 3b and 3c.

Therefore, according to the present invention, the road geometry is adjusted to meet specific requirements. The intermediate road segment 216 is made shorter than it is in reality, such that both junctions and corresponding road segments can be visualized in an easy to understand view. In action 108 in FIG. 1, the second junction 220 is mapped on or near the second borderline. This action is shown in the right road geometry graph of FIG. 2. The position of the second junction 220 is moved along a translation vector 224 having a direction parallel to the direction of the incoming segment 212 and positioned at the location 220' where the translation vector intersects the second borderline 203.

After the first junction 210 and second junction 220' have been mapped in the first and second borderline 201 and 203 respectively, the intermediate road segment 216 and two outgoing road segments 218, 222 have to be adjusted to represent the original road geometry. In an embodiment, the intermediate road segment 216 is scaled in a direction parallel to the translation vector 224 to obtain the adjusted intermediate road segment 216'. The two outgoing segments 218, 222 are moved along the translation vector 224 and visualized by the road segments 218' and 222' in the right graph of FIG. 2. The result of action 110 is an adjusted road geometry graph.

As stated above, the second junction 220 and two outgoing segments 218, 222 are moved along the translation vector 224. The adjusted intermediate road segment 216' is a scaled version of the original intermediate road segment 216. As a result, the orientation of the intermediate segment with respect to the first and second junctions 210, 220 and other segments connected to the junctions will change. This could result in an impossible road geometry, wherein the angle between the incoming road segment and any of the outgoing road segments is too large. Therefore, optionally there is provided a filtering operation 112 to filter the adjusted road geometry. This will result in a smooth transition from an incoming segment to an outgoing segment of a junction. The filtering operation 112 should only be performed when the angle of incoming segment and outgoing segment is unrealistic. Highways are designed by taking into account design rules. The rules are based on the allowable speed of vehicles and to ensure some safety aspects. This makes it unrealistic that the angle between a highway and a highway exit is larger then for example 45 degrees. By filtering the road geometry in such cases, the transition from highway to exit will be smoothened and an unrealistic angle in transition will be removed. A filtered road geometry will provide a more realistic junction view.

Finally, in action 114 a perspective complex junction view image is generated for the adjusted road geometry or the optionally filtered version of the adjusted road geometry. The generation depends on parameters such as, viewing height, viewing angle and position of first junction in image.

From the road geometry, which describes the road surface in terms of centerlines, shape of the road segments, lane counts, in x, y and height information a road layer image is generated. Furthermore, the preferred maneuvers to take through the first and second junctions can be acquired from the map database. The term "maneuver" means the sequence of road segment (lane) before the first junction, the road segment (lane) of intermediate road segment and road segment (lane) after the second junction. For each maneuver an arrow image can be generated. The arrow is superimposed on the road layer image. The arrow will indicate to the driver the optimal road position, i.e. lane or lane sequence, to pass through the first and second junctions. An embodiment of action 114 is further arranged to generate a signboard layer, visualizing the signboards in a standardized way. Un-published co-pending international application PCT/NL2008/050471 discloses a method to generate the signboard layer. The information on the signboards can be acquired from the digital map database or geographical databases. XML could be used as data format to import the information and to generate the signboard layer. Furthermore, a background layer and skyline image can be generated.

Once all layers are ready, a compound 3D scene, i.e. the junction view image, can be generated. To combine the respective layers, the so-called "blue-box" technique is used.

The junction view image could further be enhanced with trees, buildings and other road furniture such as crash barriers, lampposts, traffic lights, road signs etc. For this, sprites known from the gaming industry can be used. A sprite is a two-dimensional/three-dimensional image or animation that is integrated into a larger scene and describes a technique whereby flat images are seamlessly integrated into complicated three-dimensional scenes. This technique generates quite realistic effects with trees and other objects without a need to model them in 3D-modeling software. Sprites enable us to place 2D objects automatically in the neighborhood of the road and generate a quite realistic image.

Figure 4A:
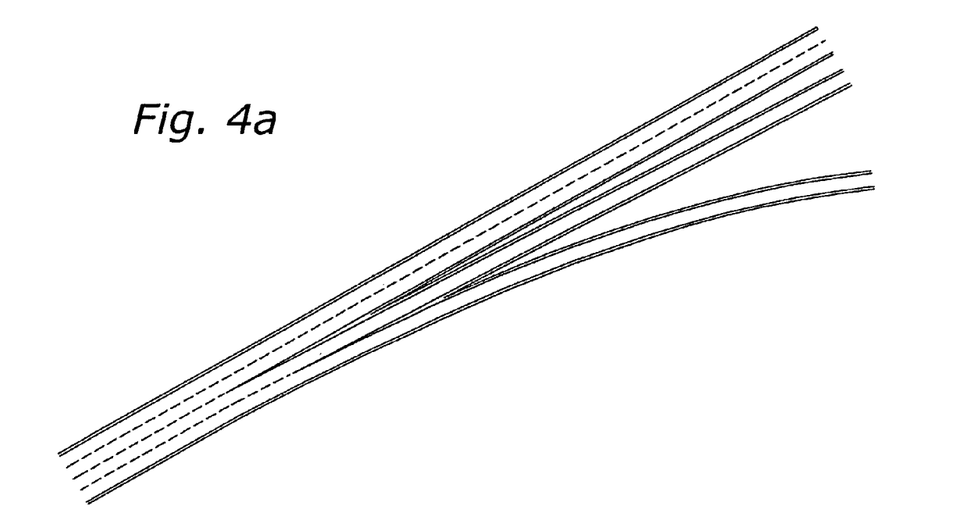
Figure 4B:
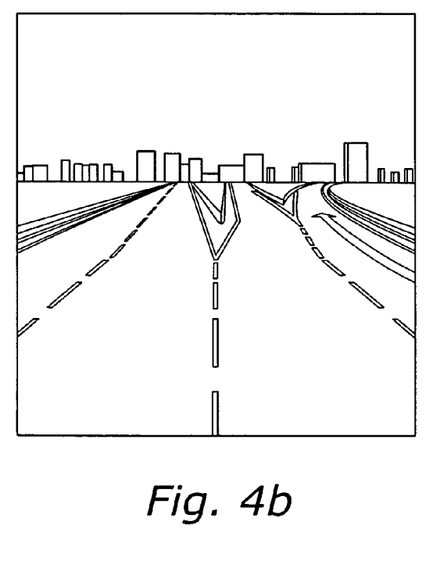
Figure 4C:
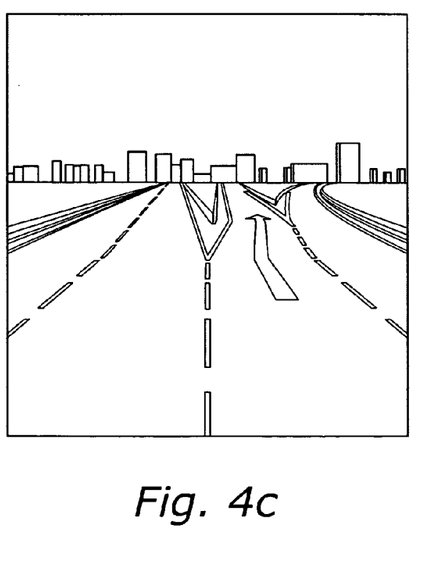

FIG. 4a shows an example of the adjusted road geometry of the road network shown in FIG. 3a. In the adjusted road geometry, after 50 meters the four lanes are bifurcated in two times two lanes. Now, the two right lanes bifurcate in two separate lanes about 25 meters after the first bifurcation. FIGS. 4b and 4c show junction view images for use in a navigation device. FIGS. 4b and 4c include an arrow superimposed on the road surface indicating the maneuver instruction for the driver to take the first lane from the right and the second lane from the right respectively. The two subsequent bifurcations, i.e. decision points, are visualized very clearly in the junction view images. Furthermore, it is possible to generate one arrow to indicate the preferred maneuver instruction along the two junctions. This is not possible in a junction view image of the original road geometry and at least would not provide the driver with information that he is approaching a junction which will be followed by another junction very quickly.

In another embodiment of action 108 (not shown), the second junction 220 is moved to the location where a straight line between the first junction 210 and second junction intersects the second border line 203. An advantage of this embodiment is that the intermediate segment 216 can be scaled to fit between the first junction 210 and the new position of the second junction 220 on the second borderline 203. Consequently, the orientation of the intermediate road segment with respect to the first and second junctions does not change due to the translation of the second junction and two outgoing segments 218, 222. In most cases, the filtering operation 112 on the adjusted road geometry can then be skipped.

In yet another embodiment, the second junction 220 is moved to the position where the intermediate road segment intersects the second border line 203. In this embodiment, only the geometry of the intermediate road segment starting from the first junction to the intersection of the intermediate road segment with the second border line 203 is used to generate the complex junction view image.

In the above, it is described that a complex junction view image will be generated only if and when a characteristic of the intermediate road segment is within a predefined range. The predefined range and the length of the zones depend on parameters such as the height of the viewing point, the viewing angle, and the position of the first junction in the junction view image for generating the complex junction view image. These parameters define which area can be visualized in a perspective view and consequently the length of the three zones 200, 202 and 204. For each set of parameters, an optimal set of ranges and zone lengths can be determined for visualizing both junctions in one perspective view. The mathematics to determine the respective lengths are commonly known to a person skilled in the art. In an embodiment, the length of the second zone, defines the lower value of the predefined range and the sum of the length of the second and third zones define the upper value of the predefined range. If the characteristic to determine whether the road geometry has to be adjusted, is the distance between the first junction and a position where a line coinciding with the incoming segment and a line though the second junction which is perpendicular to the first line, i.e. the distance between the first and second junction along a vector having the same direction as the incoming road segment to the first junction, then the lower value of the range corresponds to the length of the second zone and the upper value corresponds to the length of both the second zone and third zone. If the characteristic of the intermediate road segment depends on both distance and speed, i.e. the traveling time needed to pass through the intermediate road segment, the range is defined by the minimum allowable time between the presentation of two junctions views in the navigation application. Thus if the traveling time needed to travel from the first junction to the second junction is shorter than the minimum allowable time a complex junction view will be generated. The traveling time could depend on the maximum allowable speed, the average speed on the intermediate road segment or the actual speed of the navigation device performing the method according to the invention.

Figure 6:
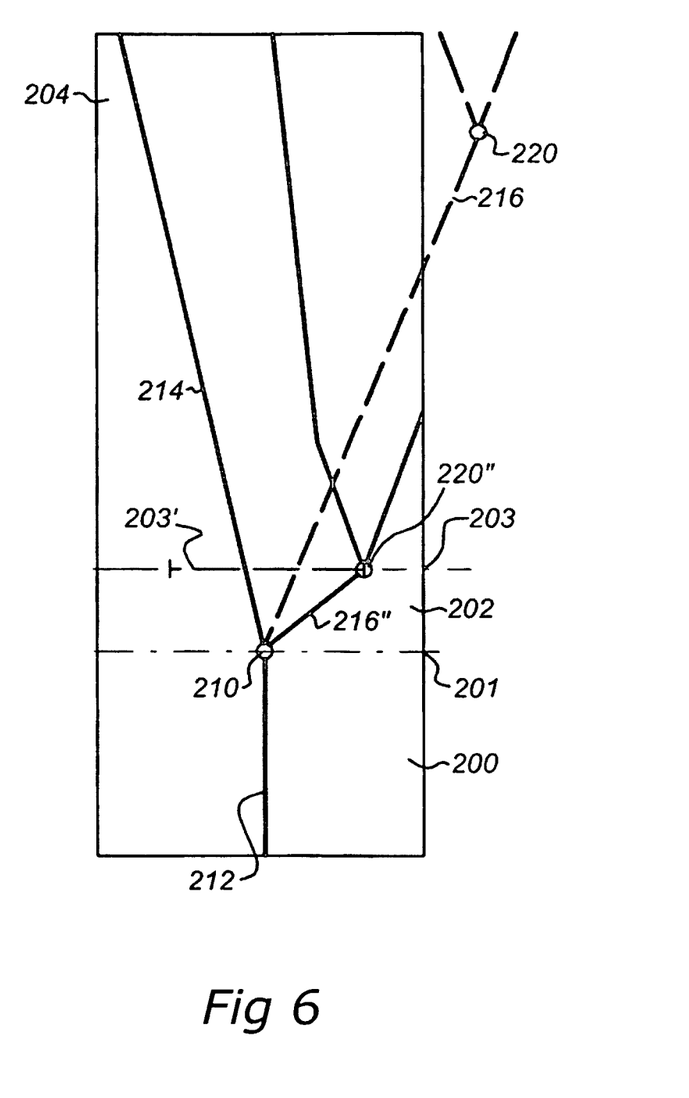
FIG. 6 illustrates another example of the road geometry adjustment according to the invention.

In the given examples, the direction of the intermediate road segment 216 is more or less in the same direction as the incoming segment 212. It could happen that the intermediate section is a sharp bend to the right whereas the distance between the first and second junction is less than 200 meters. In that case the second junction 220 lays outside the first, second and third zone 200, 202, 204 and consequently, the second junction will not be visualized in the junction view image. To overcome this problem, action 108 could be adapted to map the second junction 220 on a predefined part of the second border line 203. The part should be chosen such that a beginning part of the two outgoing road segments 218 and 222 is visualized in the junction view image. FIG. 6 shows the principle of the described adaptation of the action 108 in light of the previously described action 108. FIG. 6 shows the first zone 200, second zone 202 and third zone 204. After action 106, the zones are positioned with respect to the first junction 210 and incoming road segment 212. The second junction 220, has a position which is outside the area of the first, second and third zone. If only a transformation vector parallel to the direction of the incoming section could be used, the transformation vector will not intersect the second border line 203. Therefore, a vector corresponding to the shortest distance between the second junction 220 and a part 203' of the second borderline 203 is determined. This vector is used to perform the transformation from the original road geometry to the adjusted road geometry. FIG. 6 shows the adjusted second junction 220" and the adjusted intermediate segment 216". For the thus obtained adjusted road geometry a junction view could be generated which visualizes in an understandable and easy to interpret way both junctions and one arrow indicating the maneuver instructions along the two junctions. This embodiment enables us to create complex junction views for situations where the second junction lies to the right or left of the first junction view as not to be visible in a junction view without adjustment of the road geometry. In this embodiment the second junction is moved along two vector components, a first vector component having the same direction as the direction of travel and a second vector component having a direction perpendicular to direction of travel distance. The second vector is used to move the second junction within a predefined range from the direction of travel.

Figure 7A:
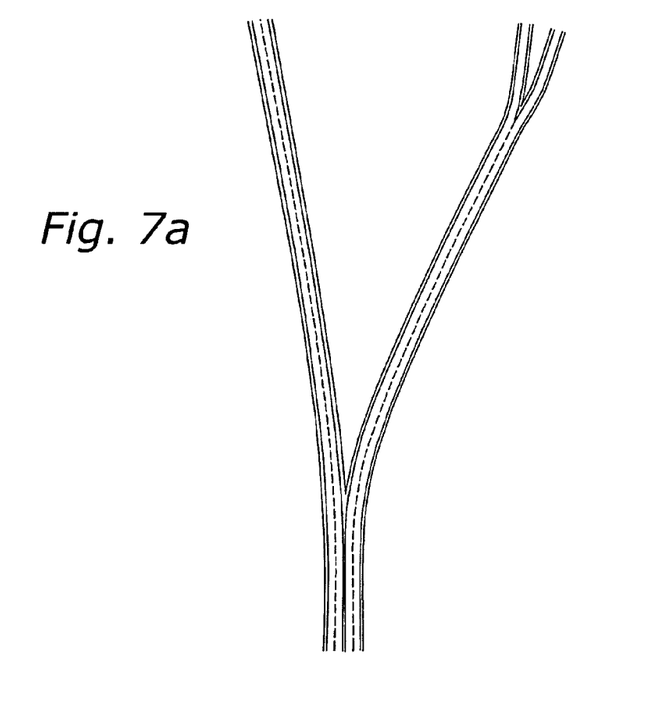
Figure 7B:
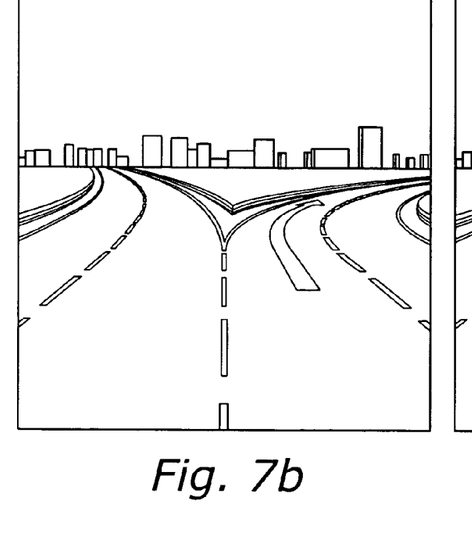
Figure 7C:
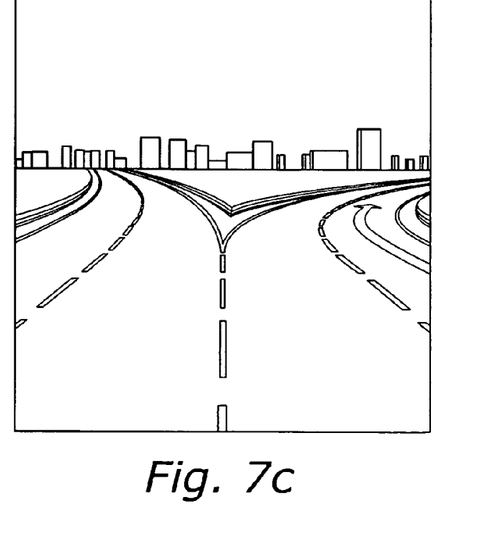

FIG. 7a shows an example of a part of a road network having a road geometry which is comparable to the road geometry shown in the graph of FIG. 6. Shown is an orthorectified view of the road surface of a highway with four lanes. After 50 meters the four lanes are bifurcated in two times two lanes and the two right lanes bifurcate in two separate lanes 200 meters after the first bifurcation. FIGS. 7b and 7c show junction view images for use in a navigation device. FIGS. 7b and 7c include an arrow superimposed on the road surface indicating the maneuver instruction wherein the driver should take the first lane from the right FIG. 7b and the second lane from the right, FIG. 7c. Although, the road segment between the two bifurcations, i.e. decision points, are relatively close to each other, due to the relative sharp bend of the road segment, the second bifurcation is not visualized in the junction view images of FIGS. 7b and 7c. The position of the second bifurcation or junction falls aside the window of the junction view image.

Figure 8A:
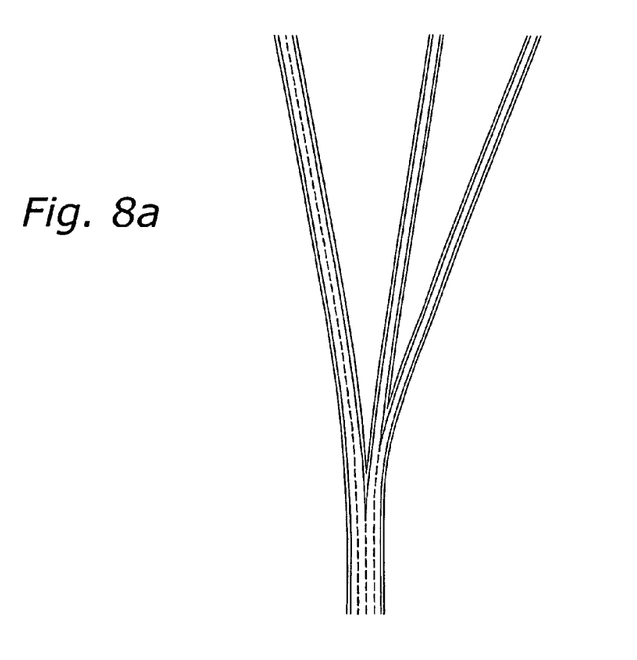
Figure 8B:
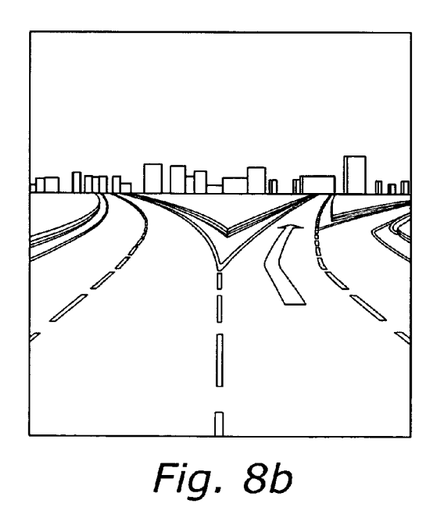
Figure 8C:
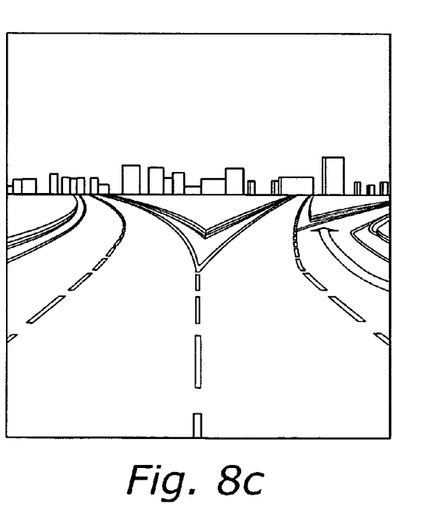

FIG. 8a shows an example of the adjusted road geometry of the road network shown in FIG. 7a. In the adjusted road geometry, after 50 meters the four lanes are bifurcated in two times two lanes. Now, the two right lanes bifurcate in two separate lanes about 25 meters after the first bifurcation. FIGS. 8b and 8c show junction view images for use in a navigation device. FIGS. 8b and 8c include an arrow superimposed on the road surface indicating the maneuver instruction for the driver to take the first lane from the right and the second lane from the right respectively. The two subsequent bifurcations, i.e. decision points, are visualized very clearly in the junction view images, notwithstanding the bend of the intermediate segment. Furthermore, it is possible to generate one arrow to indicate the preferred maneuver instruction along the two junctions. This is not possible in a junction view image of the original road geometry and at least would not provide the driver with information that he is approaching a junction which will be followed by another junction very quickly. He will only recognize that he is approaching a road segment with a sharp bend.

The presented embodiments generate a junction visualizing two subsequent junctions in case two junctions will be traversed within a short period of time but could not clearly be visualized in one single junction view image. It might be clear that it could also happen that three junctions will be traversed within said short period of time. For this case, in another embodiment of the invention the method further comprises: acquiring a third junction from the map database, wherein the second and third junction are connected by means of an intermediate road segment. A characteristic of the intermediate road segment between the second and third junction from the map database and/or a characteristic of the intermediate road segments between the first and third junction is determined. If the characteristic of the intermediate road segment between the second and third junction and/or characteristic of the intermediate road segments between the first and third junction applies to a predefined condition, the road geometry between the first and third junction has to be adjusted. Similarly to the previous embodiments, the intermediate road segment between the second and third junction is shortened and the third junction is positioned with respect to the incoming road segment of the first junction such that both the third junction and outgoing road segments are clearly visualized in the junction view image. Then a junction view image is generated visualizing the first, second and third junction using the shorter intermediate road segments.

In this embodiment, the road geometry of the three junctions has to be mapped in four zones instead of three. The second and the third zone could have predefined sizes. It is also possible that the total length of the second and third zone is predefined and that the size of each of the zones corresponds to a characteristic of each of the intermediate road segments. In this way it is possible to visualize in the junction view image the ratio between the intermediate road segment between the first and second junction and the intermediate road segment between the second and the third junction.

Furthermore, it is possible to generate one arrow to indicate the preferred maneuver instruction along the three junctions informing a driver that he is approaching a situation where three decisions have to be made in a relative short period of time.

Figure 5:
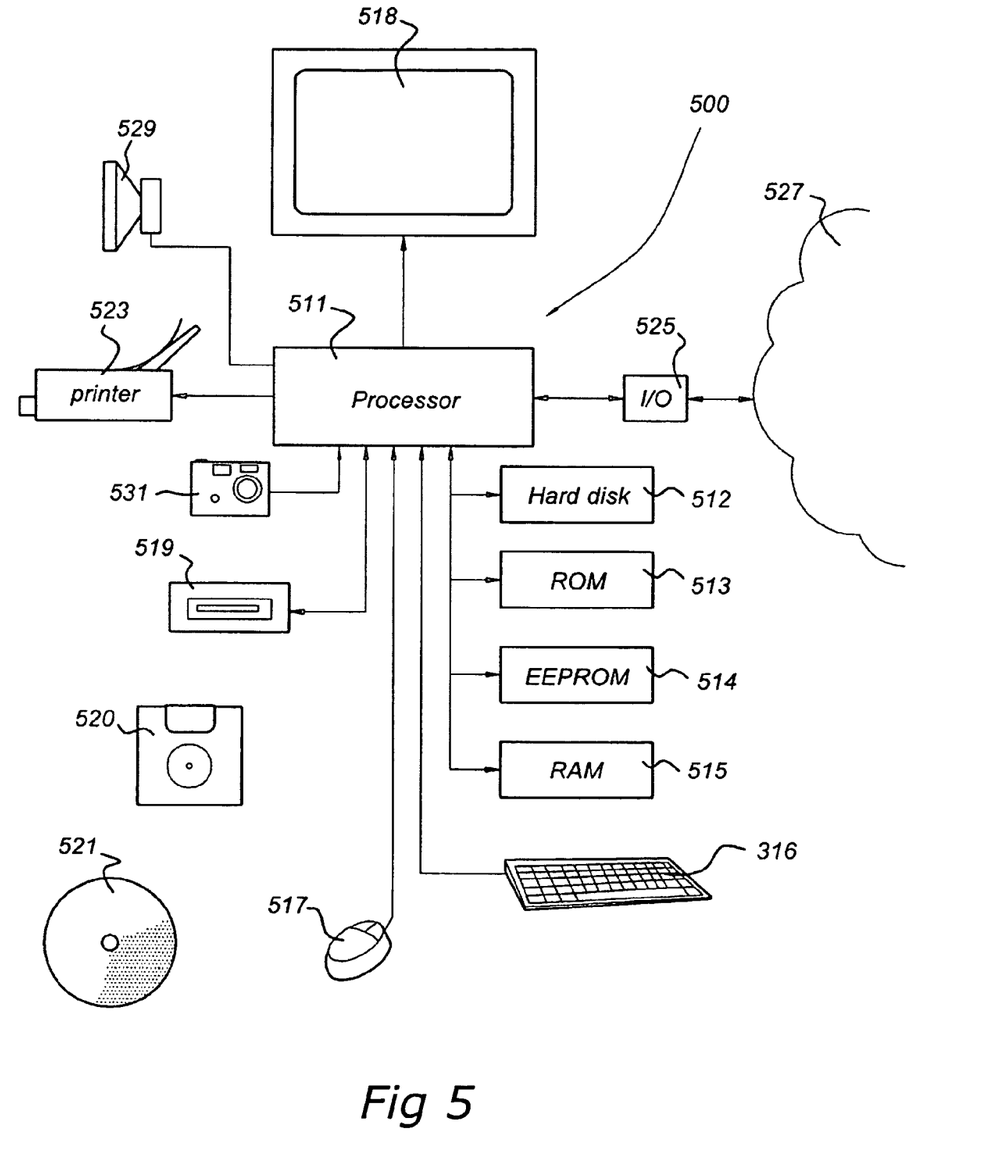
FIG. 5 is a block diagram of an exemplar computer system for implementing the method according to the invention.

The method according to the invention can be executed on a computer arrangement or computer implemented system as shown in FIG. 5.

In FIG. 5, an overview is given of a computer arrangement 500 suitable for implementing the present invention. The computer arrangement 500 comprises a processor 511 for carrying out arithmetic operations. The processor 511 is connected to a plurality of memory components, including a hard disk 512, Read Only Memory (ROM) 513, Electrical Erasable Programmable Read Only Memory (EEPROM) 514, and Random Access Memory (RAM) 515. The memory components comprises a computer program comprising data, i.e. instructions arranged to allow the processor 511 to perform the method for generating a complex junction view according to the invention. Not all of these memory types need necessarily be provided. Moreover, these memory components need not be located physically close to the processor 511 but may be located remote from the processor 511. The digital map database associated with the methods may or may not be stored as part of the computer arrangement 500. For example, the digital map database may be accessed via web services.

The processor 511 is also connected to means for inputting instructions, data etc. by a user, like a keyboard 516, and a mouse 517. Other input means, such as a touch screen, a track ball and/or a voice converter, known to persons skilled in the art may be provided too. The input means could be used to adjust manually the road geometry or junction view image to improve further the appearance of the first and second junction and connected road segments with respect to understanding of the roads in the intersections.

A reading unit 519 connected to the processor 511 may be provided. The reading unit 519 is arranged to read data from and possibly write data on a removable data carrier or removable storage medium, like a floppy disk 520 or a CDROM 521. Other removable data carriers may be tapes, DVD, CD-R, DVD-R, memory sticks, solid state memory (SD cards, USB sticks) compact flash cards, HD DVD, blue ray, etc. as is known to persons skilled in the art. Both the removable data carriers and memory components are processor readable media commonly known to the skilled person.

The processor 511 may be connected to a printer 523 for printing output data on paper, as well as to a display 518, for instance, a monitor or LCD (liquid Crystal Display) screen, head up display (projected to front window), or any other type of display known to persons skilled in the art.

The processor 511 may be connected to a loudspeaker 529 and/or to an optical reader 531, such as a digital camera/web cam or a scanner, arranged for scanning graphical and other documents.

Furthermore, the processor 511 may be connected to a communication network 527, for instance, the Public Switched Telephone Network (PSTN), a Local Area Network (LAN), a Wide Area Network (WAN), Wireless LAN (WLAN), GPRS, UMTS, the Internet etc. by means of I/O means 525. The processor 511 may be arranged to communicate with other communication arrangements through the network 527.

The data carrier 520, 521 may comprise a computer program product in the form of data and instructions arranged to provide the processor with the capacity to perform a method in accordance to the invention. However, such computer program product may, alternatively, be downloaded via the telecommunication network 527 into a memory component.

The processor 511 may be implemented as a stand alone system, or as a plurality of parallel operating processors each arranged to carry out subtasks of a larger computer program, or as one or more main processors with several sub-processors. Parts of the functionality of the invention may even be carried out by remote processors communicating with processor 511 through the telecommunication network 527.

The components contained in the computer system of FIG. 5 are those typically found in general purpose computer systems, and are intended to represent a broad category of such computer components that are well known in the art.

Thus, the computer system of FIG. 5 can be a portable device, such as a PDA, navigation device, a personal computer, a workstation, a minicomputer, a mainframe computer, etc. The computer can also include different bus configurations, networked platforms, multi-processor platforms, etc. Various operating systems can be used including UNIX, Solaris, Linux, Windows, Macintosh OS, and other suitable operating systems.

The method of processing a spatial-data-change message according to the invention is also very suitable to be implemented in navigation systems comprising a digital map database. Such navigation systems may be build for a vehicle, (e.g. car, van, truck, motorbike) or mobile device (personal digital assistant (PDA), mobile phone, handheld computer, or a personal navigation device). In that case, the navigation system comprises a computer implemented system with parts as shown in FIG. 5. A computer readable memory carries a digital map. The computer implemented system comprises further an input device for inputting a destination to plan a route to said destination and retrieving actual position information of the navigation system. When traveling along the planned route, the system will show a junction view at defined times when approaching a junction, i.e. decision point. When a next decision point is expected within a predefined time or distance, the navigation system will perform the method according to the invention, to generate on the fly a junction view visualizing both junctions, i.e. decision points, and corresponding maneuver instructions in one junction view image and outputting the image on a display unit. In a navigation system, the actual driving speed could be used to estimate the traveling time from the first junction to the second junction and the characteristic to decide whether the user is approaching a complex junction or not. If the user is driving fast, more situations will be recognized as complex junctions than when the user is driving slowly along the same route. As a result, whether or not two subsequent junctions will be visualized by the navigation system as one complex junction view or two individual simple junction views, will depend on the actual driving speed.

If the present invention is used to enhance an existing digital map database with complex junction views, the method further comprises the action of storing the complex junction view in a database and linking the complex junction view with the first junction in the digital map database. The database where the junction views are stored could be part of the digital map database or a side file associated with the digital map database. A database product comprising a junction view according to the invention, could be in the form of a digital database including the junction view, a side file associated with a digital map stored on a processor readable medium. For such pre-computed junction views, the real time vehicle speed is not known and an estimated speed can be derived from posted speed limits in the map database or functional road classifications also in the database.

The foregoing detailed description of the invention has been presented for purposes of illustration and description. The examples show only bifurcations, the invention could also be used for trifurcations and even more complex junctions. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. Method of generating a junction view image, the method comprising:
 acquiring a first junction from a map database;
 acquiring a second junction from the map database, wherein the first and second junction are connected by means of an intermediate road segment;
 acquiring a road geometry of road segments forming the first and second junctions;
 determining a characteristic of the intermediate road segment between the first and second junction from the map database; and
 if the characteristic of the road segment applies to a predefined condition:
 adjusting the road geometry resulting in a shorter intermediate road segment, wherein adjusting the road geometry comprises moving the second junction and associated outgoing segments towards the first junction; and
 generating the junction view image visualizing the first and second junction using the adjusted road geometry with the shorter intermediate road segment.

2. Method according to claim 1, wherein adjusting the road geometry is arranged to map the road geometry on a first, a second and a third zone each having a corresponding first, second and third zone length respectively, wherein the first junction is mapped at a first borderline between the first and second zone and the second junction is mapped at a second borderline between the second and third zone.

3. Method according to claim 2, wherein the road geometry comprises an incoming segment ending at the first junction, an intermediate segment between the first and second junction and two or more outgoing segments starting at the second junction, wherein adjusting the road geometry comprises transforming the intermediate segment in a direction parallel to the direction of the incoming section to map the intermediate segment in the second zone.

4. Method according to claim 3, wherein the adjusting the road geometry further comprises translating the two or more outgoing segments along a vector equivalent to the translation of the second junction due to the transformation of the intermediate segment.

5. Method according to claim 2, wherein adjusting the road geometry further comprises filtering action to smooth the road geometry which is performed after mapping the road geometry in the respective zones.

6. Method according to claim 5, wherein filtering action is performed if the angle between the incoming segment and the outgoing segments is unrealistic.

7. Method according to claim 1, further comprising: generating a maneuver instruction passing through the first and second junctions according the modified geometry; and wherein generating the junction view image is further arranged to superimpose a view of the maneuver instruction on the visualization of the first and second junctions.

8. Method according to claim 1, wherein the characteristic is the length of the road segment between the first and second junction and the condition is that the length is in a predefined range.

9. Method according to claim 8 wherein the predefined range is 20-300 meters.

10. Method according to claim 1, wherein the characteristic is the traveling time needed to travel from the first junction to the second junction with a defined traveling speed associated with the road segment between the first and second junction or the traveling time needed to travel from the first junction to the second junction with a measured traveling speed associated with the real time speed of the vehicle as measured by the on-board navigation system, and the condition is that the traveling time is shorter than a predefined value.

11. Method according to claim 10, wherein the predefined value is 10 seconds.

12. Method according to claim 1, wherein the method further comprises outputting the complex junction view on a display unit.

13. Method according to claim 1, wherein the method further comprises storing the complex junction view in a database and linking the complex junction view in said database to the first junction in the digital map database.

14. Method according to claim 1, wherein the method further comprises:
- acquiring a third junction from the map database, wherein the second and third junction are connected by means of an intermediate road segment;
- determining a characteristic of the intermediate road segment between the second and third junction from the map database; and
- if the characteristic of the intermediate road segment between the second and third junction applies to a predefined condition:
- adjusting the road geometry resulting in a shorter intermediate road segment between the second and third junction; and
- generating is adjusted to generate the junction view image visualizing the first, second and third junction using the shorter intermediate road segments.

15. A database product comprising one or more complex junction views generated by the method according to claim 1.

16. A computer implemented system for generating a complex junction view, the system comprising a processor and memory connected to the processor, the memory comprising a computer program comprising data and instructions arranged to allow said processor to perform the method according to claim 1.

17. A processor readable medium provided with a computer program product comprising data and instructions which, when executed by a computer arrangement, allow said computer arrangement to perform the method according to claim 1.

* * * * *